Patented June 25, 1946

2,402,760

UNITED STATES PATENT OFFICE 2,402,760

LUMINESCENT MATERIAL

Humboldt W. Leverenz, South Orange, N. J., assignor to Radio Corporation of America, a corporation of Delaware No Drawing. Application June 27, 1942,
Serial No. 448,849

5 Claims. (Cl. 252—301.4)

My invention relates to luminescent materials and their method of manufacture and particularly to materials of the silicate and germanate type.

Many types of phosphors have been proposed for use in cathode ray tubes and luminescent lamps, the principal requirement being high fluorescent efficiency under electronic, ionic or radiant energy excitation. Thus, the art has steadily progressed in developing such phosphors, the principal emphasis being placed on this requirement of high efficiency and possibly to an equal extent upon the spectral distribution of the luminescence produced by such phosphors. The recent development of aircraft position and indicating equipment utilizing highly phosphorescent luminescent screens in cathode ray tubes introduces an entirely new problem in the art of phosphor synthesis and manufacture, namely the synthesis of materials which are highly phosphorescent. Thus, it is required, for example, to trace the trajectory of an approaching aircraft on the screen of a cathode ray tube and have this trajectory visible as a phosphorescing trace for a relatively long period of time. In such systems the beam of the cathode ray tube is sequentially pulsed to form on the screen a phosphorescent light trace representing the trajectory of the aircraft. Luminescent materials having high fluorescent efficiency produce a very intense fluorescence referred to as "flash" which detracts the observer's attention from the relatively low intensity phosphorescent light trace and reduces the dark-adaptation of the eye. Consequently, it is desirable to provide phosphors having a very low ratio of flash to phosphorescent light following a predetermined period of time. This desired property may be expressed in terms of. "flash ratio," which may be defined as the ratio of peak fluorescence to phosphorescence at some instant of time, such as from one to five seconds following excitation to luminescence. Various sulphides, such as silver activated, wurtzite-form zinc sulphide, have been used with fair satisfaction, such sulphides having a numerical subjective flash ratio of about 600–800 to 1 at one second following excitation to luminescence, as indicated on an instrument recording integrated luminescence energy, the integration period being from 10 to 20 micro-seconds. This means that the total energy of phosphorescence following cessation of excitation is only about $1/600$ to $1/800$ of the total energy of luminescence which includes both fluorescence and phosphorescence during the time of excitation. Similarly a copper activated zinc sulphide of the wurtzite form has a flash ratio at one second of from 200–300 to 1. Consequently, the observation of such a phosphor screen is rendered difficult because of the great contrast between the fluorescence and the phosphorescence, which phosphorescence it is desired to observe. Furthermore, sulphide phosphors of the type referred to above are quite difficult to process in the form of screens for cathode ray tubes because of their inherent instability to atmospheric conditions and heat. The stable properties of various silicates are ideally suited to this application but silicates made heretofore have high flash ratios, exceeding 1000 to 1 at one second. In fact the flash ratio at .06 second may be as high as 100 to 200 which makes the silicate materials known heretofore wholly unsuited for use in the described application.

It is an object of my invention to provide phosphor materials of the silicate type which are highly phosphorescent following excitation to luminescence. It is another object to provide methods of manufacture and phosphor materials wherein the ratio of initial luminescence upon cessation of excitation to phosphorescence is lower than that of phosphor materials made heretofore, and it is a further object to provide phosphor materials having low flash ratios which are stable under atmospheric conditions and under the heating conditions usually encountered in cathode ray tube manufacture. These and other objects, features and advantages of my invention will be apparent upon consideration of the following description of several embodiments of my invention.

Phosphors made heretofore of the silicate type have had incorporated therein various activators, such as manganese. Such activated silicate phosphors have exceedingly high flash ratios even at times following excitation as little as .06 second and are wholly unsuited for use in observing trajectories of various moving objects by phosphorescent light.

In accordance with my invention I provide a non-activated silicate type phosphor wherein the flash ratio at one second following excitation is considerably less than 100. More particularly, in accordance with one teaching of my invention, I provide a beryllium-zirconium silicate or germanate having no activator whatsoever. An exceedingly small amount of copper, silver or rhenium may be present as a means for modifying the color of my unactivated phosphor, such small amount of copper, silver or rhenium shifting the color response from a blue color to a slightly less saturated pale blue color. In my U. S. Patent No. 2,171,145 and the divisional patents thereof, Nos. 2,182,087 and 2,212,209, I described and claimed various silicate type phosphors of the manganese activated beryllium-zirconium silicate or germanate types wherein the manganese content was necessarily between the limits of 0.1 gram mols (molal) to 0.00001 molal with respect to the total cation gram molecular weight of the phosphor to obtain the objects and advantages of high fluorescent efficiencies therein set forth. I have found in following the teachings of my invention that the presence of manganese activator in phosphors of the beryllium-zirconium silicate type decreases the phosphorescence intensity and duration of phosphorescence, an observation which I have not been able to confirm in unactivated zinc silicates or zinc beryllium silicates. I have found, however, that if no manganese whatsoever is used in beryllium-zirconium silicates or manganese is used to an amount at least less than 0.00001 molal, the objects of my invention are obtained and the flash ratio is less than 100 at one second following cessation of excitation for such non-activated beryllium-zirconium silicates. To define the maximum manganese content I refer to my new phosphor as containing substantially no manganese and by this term I mean that the manganese content is less than 0.00001 molal. Preferably the upper limit for manganese content is 0.000005 molal. Consequently, in the preparation of my phosphor materials a great degree of purity must be maintained throughout the preparation of the constituents and thermo-synthesis of the phosphor, particularly with respect to the manganese content. Further in accordance with my invention I have found that if the manganese content of my phosphor is maintained lower than 0.00001 molal, it may nevertheless contain a small amount of copper, silver or rhenium without an increase in the flash ratio. It appears that such use of copper, silver or rhenium is not an activator use inasmuch as an increase of fluorescence does not occur and the flash ratio remains substantially the same as long as manganese is not present to the maximum allowable limit referred to above.

I have referred to my material as a beryllium-zirconium silicate having zero manganese content or at least a very low maximum content of manganese and it will be appreciated that this phosphor is a crystalline structure consisting of the constituents of beryllium oxide, zirconium oxide and silicon oxide and are of the silicate type wherein the relative proportions of the three oxides may be varied over wide limits. Thus, it must be appreciated that my invention is not limited to ortho-silicate proportions based on the oxide content. In addition, my invention is not a mixture of beryllium silicate and zirconium silicate in the usual chemical sense but actually is an homogeneous crystalline mass comprising a single crystal lattice structure. Furthermore, whether the oxides are used in ortho proportions or in widely differing proportions as hereinafter explained, the beryllium, zirconium and silicon oxides are held in a single lattice structure. In this material the ratio of the constituents on an oxide basis may vary over wide limits. Thus, the beryllium oxide to zirconium oxide may vary from 1/99 to 99/1 molal per cent, and the silicon content may vary from 33% to 200% based on ortho-silicate proportions. Expressed as a formula in terms of the oxide constituents, this is $$u(BeO)\,v(ZrO_2)\,w(SiO_2):xMn$$

wherein the molar ratio of $$\frac{u}{v}$$

is preferably not less than 1/99 or greater than 99/1, the molar ratio of $$\frac{u+v}{w}$$

is not less than 1/3 or greater than 2, $u+v$ is equal to 1 gram molecular weight and the value of $x$ is less than 0.00001 molal.

As indicated above the purity of the constituents of my phosphor should be very high and the amount of manganese maintained as near to zero as possible and at least lower than 0.00001 molal with respect to the total cation gram molecular weight of the phosphor. Consequently, the solutes and reagents used in the preparation of the constituents should be of a corresponding purity. The following examples of phosphors made in accordance with my invention will refer specifically to the use of beryllium and zirconium, and it will be appreciated that other metals selected from the first subgroup of the fourth group of the periodic system and comprising titanium, hafnium, and thorium may be substituted in whole or in part for the zirconium. However, it must be distinctly understood that the substitution of other metals, such as zinc, magnesium or cadmium for the beryllium, will not produce the beneficial effects of high phosphorescence and low flash ratio obtainable by the use of beryllium. Furthermore, the molar ratio of beryllium oxide content should preferably be not less than 1/99% molal or greater than 99% molal with respect to the total 100% cation molality of the phosphor. Furthermore, germanium or germania may be substituted in whole or in part for the silicon or silica respectively referred to in the said following examples.

The starting point for my phosphor may be the pure soluble salts of beryllium and zirconium, such as the nitrates, chlorides, carbonates or other soluble salts thereof. In fact, any soluble salt may be utilized, from a solution of which or upon the thermal decomposition of which the finely divided beryllium and zirconium oxides may be derived. I prefer to utilize the silica in a very finely divided form, and in fact this silica may be of substantially colloidal particle size. The precipitated oxides of beryllium and zirconium may be added to the silica, well mixed and fired as referred to more particularly hereinafter, although I prefer to precipitate insoluble, readily decomposable compounds of beryllium and zirconium around the finely divided silica particles. Thus, the silica may be added to the soluble salt solution of the metals, the metal compounds then being precipitated around the silica particles in the form of carbonates, such as by adding ammonium carbonate to the soluble salt solution following acidification, such as by nitric acid. In the precipitating action the minute silicon dioxide particles serve as nuclei about which the beryllium and zirconium carbonates agglomerate.

It will be noted from the above example, that no activator whatsoever is utilized and the activator-free material is then heated or fired in a refractory crucible at a temperature from 900° C. to 1800° C. for a period of from 5 minutes to 4 hours although this is not critical. Specific quantities of the base material constituents which I have found suitable in satisfying the objects of my invention are shown in the following table together with the preferred firing temperature and time:

|   |   | Hours |
|---|---|---|
| (1) | $2ZrO_2 \cdot BeO \cdot 3SiO_2$:Cu, 1450° C. | 2 |
| (2) | $18ZrO_2 2BeO 19SiO_2$:±Cu, 1450° C. | 3 |
| (3) | $2ZrO_2 18BeO 11SiO_2$:±Cu, 1450° C. | 3 |
| (4) | $1ZrO_2 2BeO 2SiO_2$, 1450° C. | 3 |
| (5) | $1ZrO_2 4BeO 3SiO_2$, 1450° C. | 3 |
| (6) | $1ZrO_2 2BeO 1.58SiO_2$, 1450° C. | 3 |

The materials in the above table may or may not contain small amounts of copper, silver or thorium up to a maximum of 0.005 mol per cent based on the total cation molality. The flash properties and phosphorescent properties of one of the above examples, namely example No. 4, except that it contains 0.0007 molar copper, are shown in the following table which gives the intensity at the instant of cessation of excitation by cathode rays and at short intervals of time thereafter for this material in comparison with corresponding intensities for a copper-activated zinc sulphide. In addition I have shown in this table the flash ratio for each of the intensities for both materials:

| Seconds | ZnS:Ag | | $ZrO_2 \cdot 2BeO \cdot 2SiO_2$ | |
|---|---|---|---|---|
|  | Intensity | Flash ratio | Intensity | Flash ratio |
| t=0 | 6,700 | 1 | 440 | 1 |
| 0.25 | 37 | 180 | 30 | 14.7 |
| 0.5 | 18.5 | 360 | 12 | 36.7 |
| 1.0 | 9.5 | 705 | 6 | 73.5 |
| 1.5 | 6.5 | 1,030 | 4 | 110 |
| 2 | 4.5 | 1,490 | 2.5 | 175 |
| 2.5 | 2.8 | 2,390 | 1.5 | 295 |
| 8 | 0.7 | 9,050 | 0.6 | 735 |
| 12 | 0.4 | 10,800 | 0.25 | 1,760 |

It will be noted from the above tabulation that the manganese-activated beryllium zirconium silicate is not included inasmuch as the phosphorescence at one-quarter second following cessation of excitation is substantially zero rendering the manganese activated material entirely unsuitable for use in cathode ray trajectory plotting tubes. The above table, however, shows the very low flash ratio over the period from one-quarter second to twelve seconds of my new material in comparison with a silver activated zinc sulphide, these ratios being from 6 to 12 times better than those of the zinc sulphide over the entire period of phosphorescence between one-quarter second and twelve seconds following cessation of excitation.

I claim:

1. A crystalline luminescent material represented by the general formula

$u(BeO) v(XO_2) w(YO_2):xMn$ wherein X is a metal selected from the group of metals consisting of zirconium, titanium, hafnium, and thorium, Y is an element selected from the group of elements consisting of silicon and germanium, the molar ratio of $$\frac{u}{v}$$

is from 1/99 to 99, the molar ratio of $$\frac{u+v}{w}$$

is from 1/3 to 2, and the sum of $u+v$ is equal to one gram molecular weight, the value of $x$ being less than 0.000005 molality and of such a small value that said material has a flash ratio less than one hundred to one at one second following cessation of excitation to fluorescence.

2. A crystalline luminescent material comprising an oxygen containing composition of an element selected from the group consisting of silicon and germanium with beryllium and a metal selected from the group of metals consisting of zirconium, titanium, hafnium and thorium, said material having a manganese content not greater than 0.000005 molality and having a ratio of fluorescence to phosphorescence less than one hundred to one at one second following cessation of excitation to fluorescence.

3. A luminescent material comprising a silicate of beryllium and a metal selected from the group of metals consisting of zirconium, titanium, hafnium and thorium, said silicate containing substantially no manganese activator or other activator in excess of 0.000005 molal per cent of the total cation molality producing a ratio of fluorescence to phosphorescence greater than one hundred to one at one second following cessation of excitation of said material to fluorescence.

4. A luminescent material consisting of a crystallized multi-metal oxide combination of a compound selected from the group consisting of silica and germania wherein one of said metal oxides is beryllium oxide and the molar ratio of beryllium oxide to the other metal oxide is from 1/99 to 99/1 based on the total one hundred per cent cation molality of said combination, said combination having substantially a manganese content not exceeding 0.000005 molality and having a flash ratio at one second following cessation of excitation to fluorescence less than one hundred to one.

5. A crystallized luminescent material consisting of the oxides of beryllium, zirconium, and silicon the molar ratio of beryllium oxide to zirconium oxide being from 1/99 to 99/1 based on the total one hundred per cent cation molality of said combination, said combination having traces of manganese materially less than 0.000005 molality and having a flash ratio less than one hundred to one at one second following cessation of excitation to fluorescence.

HUMBOLDT W. LEVERENZ.